United States Patent [19]

Morrison et al.

[11] 4,119,844
[45] Oct. 10, 1978

[54] PHONOGRAPH CARTRIDGE AND SENSOR ASSEMBLY

[75] Inventors: Howard J. Morrison, Deerfield; Donald K. Fletchic, Arlington Heights, both of Ill.; Ralph H. Baer, Manchester, N.H.

[73] Assignee: Marvin Glass & Associates, Chicago, Ill.

[21] Appl. No.: 710,024

[22] Filed: Jul. 30, 1976

[51] Int. Cl.² ............................................. G01D 5/34
[52] U.S. Cl. ...................... 250/231 R; 179/100.4 D; 179/100.41 K
[58] Field of Search ................ 250/231 R, 231 SE; 179/100.41 K, 100.41 L, 100.4 D, 100.3 V; 274/37, 13, 14

[56] References Cited

U.S. PATENT DOCUMENTS

| | | | |
|---|---|---|---|
| 3,368,080 | 2/1968 | Nakagiri et al. | 179/100.4 D |
| 3,646,279 | 2/1972 | Stanton | 179/100.41 K |
| 3,745,263 | 7/1973 | Kawakami | 179/100.41 K |

Primary Examiner—M. Tokar
Attorney, Agent, or Firm—Mason, Kolehmainen, Rathburn & Wyss

[57] ABSTRACT

A phonograph cartridge is provided for use on a programmable phonograph turntable or changer. The cartridge includes a housing for mounting an electromechanical transducer on the end of a phonograph tone arm and a stylus connected to the electro-mechanical transducer for the reproduction of audio information contained in the groove of a record carrier. A sensor including a light source and a photodetector is mounted on the housing in a position in close proximity to the stylus to provide a unitary cartridge and sensor assembly. The stylus and sensor elements are mounted on a subframe portion which is removable from the housing to facilitate replacement of the stylus or sensor without requiring replacement of the entire phonograph cartridge.

21 Claims, 7 Drawing Figures

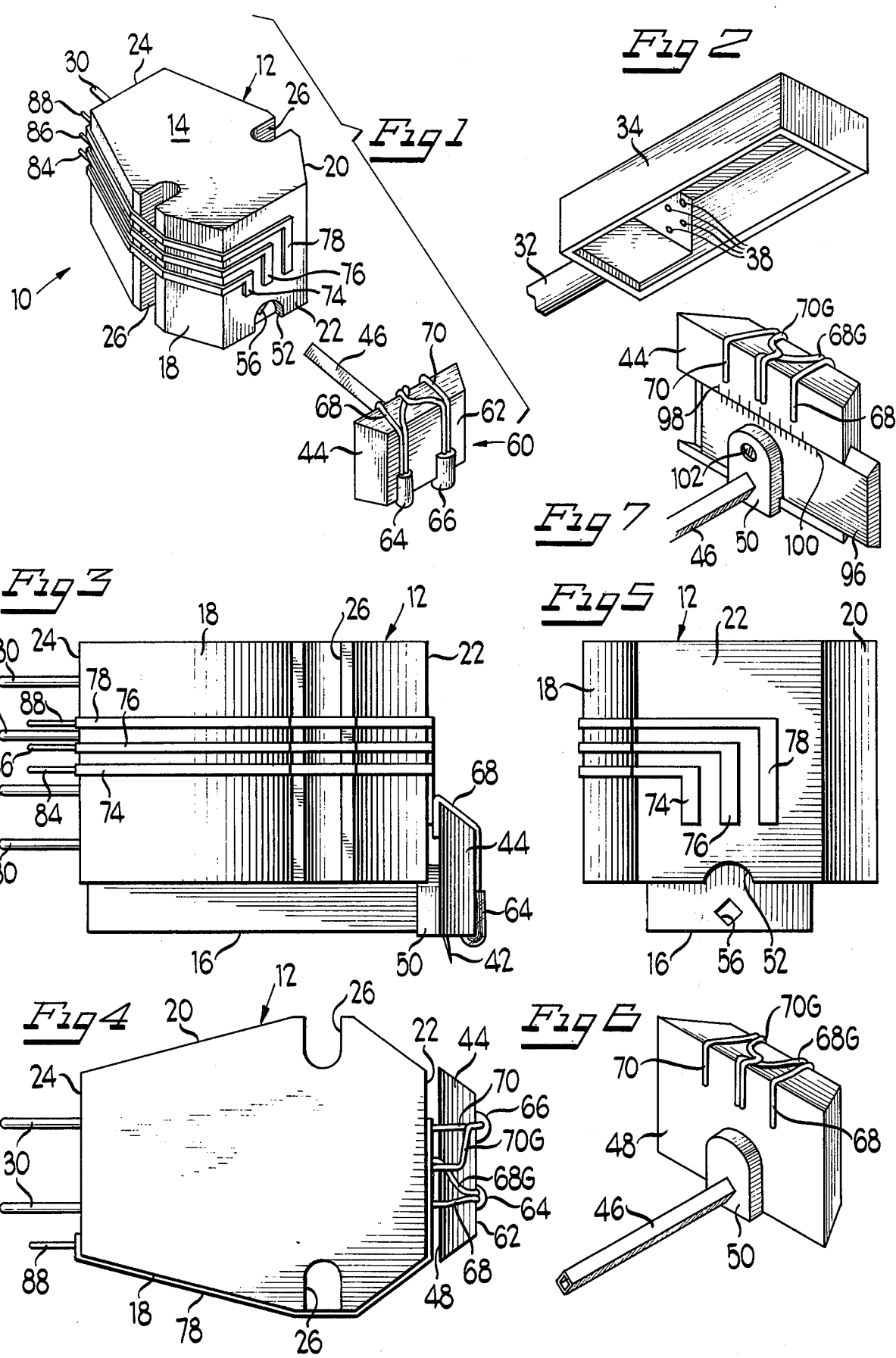

PHONOGRAPH CARTRIDGE AND SENSOR ASSEMBLY

BACKGROUND OF THE INVENTION

1. Field of the Invention

The present invention relates to phonograph cartridges particularly adapted for use on programmable phonograph record turntables and changers capable of detecting intraband land areas to permit skipping of certain bands or playing the various bands on a particular recording in a non-sequential order.

2. Brief Description of the Prior Art

Various programmable record changers and turntables have been proposed in which a sensor comprising a light source and photodetector to detect the presence of an intraband land area on a typical disc-type recording. Conventional sensors were mounted directly on the tone arm adjacent the phonograph stylus. Some phonograph cartridge systems have been designed in which an electro-mechanical transducer, such as a magnetic or ceramic transducer, were produced as an integral unit for easy removal and replacement on the tone arm, for example, when the stylus had become worn to a point where it might damage the recording.

SUMMARY OF THE INVENTION

An object of the present invention is to provide a phonograph cartridge and sensor assembly for use on programmable phonograph devices in which a portion of the cartridge, including the stylus and the sensor, is replaceable in the same electro-mechanical transducer portion for reducing the replacement costs of worn or non-functional elements.

In accordance with the above and other objects, the present invention provides a phonograph cartridge assembly which includes an integral sensor comprising a light source and a photodetector. The cartridge includes a housing for mounting an electro-mechanical transducer for the reproduction of audio information contained in the groove of a record carrier. A sensor or scanner, including a light source and a photodetector, is mounted on the housing in a position in close proximity to the stylus to provide a unitary cartridge and sensor assembly. The stylus and sensor elements are mounted on a subframe portion which is removable from the housing to facilitate replacement of the stylus or sensor without requiring replacement of the entire phonograph cartridge.

Other objects, features and advantages of the invention will be apparent from the following detailed description taken in connection with the accompanying drawings.

BRIEF DESCRIPTION OF THE DRAWINGS

FIG. 1 is an exploded perspective view of a phonograph cartridge made in accordance with the concepts of the present invention;

FIG. 2 is a perspective view, on a reduced scale, of a tone arm for mounting the cartridge of FIG. 1;

FIG. 3 is a side elevational view, on an enlarged scale, of the phonograph cartridge of FIG. 1;

FIG. 4 is a top plan view of the phonograph cartridge of FIG. 3;

FIG. 5 is a front elevational view of the phonograph cartridge of FIG. 3, with the stylus and sensor removed;

FIG. 6 is a perspective view of the stylus and sensor mounting frame; and

FIG. 7 is a perspective view of an alternate embodiment of the stylus and sensor mounting frame.

DESCRIPTION OF THE PREFERRED EMBODIMENT

A phonograph cartridge, generally designated 10, made in accordance with the concepts of the present invention, is shown in a perspective view in FIG. 1. The phonograph cartridge includes a generally rectangular housing 12 having a flat top 14 and bottom 16 and a pair of side walls 18 and 20 which are tapered slightly toward a generally vertical front wall 22 and rear wall 24. The housing 12 also includes a pair of vertical troughs 26, one in each of the side walls 18 and 20. The housing 12 mounts within its interior a conventional electro-mechanical transducer, such as a magnetic or ceramic transducer which are commercially available for high fidelity and stereo reproduction systems. Typically, the housing includes four rearwardly directed pins 30 connected to the electro-mechanical transducer for carrying electrical signals to a conventional amplification system.

The cartridge 10 is mounted on the end of a tone arm 32 within a cartridge shell 34. The four signal pins slidably fit within four appropriately sized openings 38 within the shell for mounting the cartridge 10 therein. Each of the apertures 38 includes an electrically conductive material for transmitting the signals to the amplifier.

A phonograph stylus 42 for tracking the grooves of a record carrier is mounted to a removable frame portion 44 (FIGS. 1 and 3) which mounts to the front wall 22 of the housing 12. The stylus 42 is connected to a generally square, vibration transmitting shaft 46 extending from the rear wall 48 of the frame 44. A rearwardly extending boss 50 on the rear wall 48 fits snugly within a complementary shaped recess 52 on the front wall 22 of the cartridge to maintain alignment between the stylus 42 and the cartridge. The square shaft 46 fits snugly within a square aperture 56 in the housing and frictionally secures the movable frame member 44 to the housing 12. The mechanical vibrations of the stylus caused by the undulations in the record grooves are transmitted to the square shaft 46 and converted by the electro-mechanical transducer to the output signals on the pins 30.

In programmable phonograph devices as shown in the prior art, the intraband land areas passing below the stylus or tone arm are sensed to determine the starting and ending points of various recorded sound track bands, a sensor may be utilized which operates in a reflective mode. The sensor is connected to a land sensing electronic circuit to detect the presence of a land area below the stylus 42. Generally, the higher reflectivity of the intraband land areas with respect to the recorded band areas is measured to indicate the occurrence of such an intraband land area below the stylus. Preferably, the sensor should be as close to the stylus as practical so that the reflectivity of the record surface being measured is at a point substantially close to the stylus.

In the present invention, a sensor, generally designated 60, is mounted on the front wall 62 of the movable frame member 44. The sensor 60 includes as its active elements a light source 64 such as a light emitting diode or a miniature incandescent lamp and a photodetector 66 such as a phototransistor or other photocell. These elements, the light source 64 and the photodetector 66, are mounted to the front wall 62 at approximately its lowermost edge so as to be substantially close to the stylus 42 such as shown in FIG. 3. The leads 68 for the light source and 70 for the photodetector extend across the top of the frame to the rear wall 48 as shown in FIG. 6. Common or ground leads 68g and 70g are connected together on the rear thereof to form a common ground.

The ends of the leads 68 and 70, and the common leads 68g and 70g engage a plurality of contact strips 74, 76 and 78 on the front wall 22 of the housing as best seen in FIGS. 1 and 5. The strips 74, 76 and 78 extend upwardly at different lengths so as not to cross, and around the side 18 of the housing 12 to the rear wall 24 where each terminates in a sensor pin 84, 86 and 88, respectively. The pins 84, 86 and 88 slidingly engage a similar plurality of complementary apertures (not shown) in the cartridge shell 34, as explained with reference to the pins 30 when the cartridge 10 is mounted therein for connection to the land sensing circuitry. Thus, the sensor 60 is an integral part of the phonograph cartridge 10.

It should be pointed out that when a sensor 60 is used having two active elements, a light source and a photodetector, each element should be spaced equally on opposite sides of the phonograph stylus 42 so that the reflection point is on the longitudinal axis of the stylus. The present invention can be easily adapted for use with any desired sensor design or configuration.

An alternate embodiment of the removable frame portion 44 is shown in FIG. 7. In this alternate embodiment, the frame portion 44 is slidably mounted to a generally horizontal dovetail member 96. The dovetail member 96 is secured to the stylus 42 and vibration transmitting shaft 46 for mounting on the cartridge 10 as described previously. In this embodiment, the sensor elements, the light source 64 and the photodetector 66 are movable with respect to the stylus to permit user adjustment of the sensor 60 with respect to the stylus 42 if required or otherwise desired. The housing portion 44 includes a scale 98 in alignment with a scale 100 on the dovetail portion 96 to facilitate accurate relative adjustment between the elements. A set screw 102 is provided on the dovetail portion 96 to lock the respective elements in their predetermined relative position. Thus, if the user of such a cartridge determines that adjustment of the relative positions between the sensor 60 and the stylus 24 is necessary, it can be easily accomplished with this alternate embodiment. The vertical contact strips 74, 76 and 78 are sufficiently wide to maintain contact with their respective sensor leads over a wide range of adjustment. If a wider range of adjustment is desired, the contact strips 74, 76 and 78 may be aligned horizontally, with appropriate repositioning of the sensor leads, to permit a range of adjustment substantially equal to the width of the cartridge 10. Additionally, if desired, an adjustment screw or lead screw could be provided on the dovetail member 96 to move the frame member 44 relative thereto by turning the lead screw. The lead screw would facilitate minute adjustments and provide additional accuracy adjustment.

This alternate embodiment (FIG. 7) of the removable frame portion 44 for adjustably mounting the sensor 60 with respect to the stylus 42 provides an additional economic benefit in that the frame portion 44 which mounts the sensor 60 can be removed and replaced, if necessary, without requiring replacement of the stylus. Similarly, the stylus can be replaced while maintaining the sensor elements if it is determined that they are still serviceable thus requiring less expense when replacing worn out elements.

Although the specific alignment system as described, including the boss 50 for engaging the recess 52 has been shown in the drawings, it is contemplated that many other mounting systems could be used with equal reliability. For example, the three leads 68, 70 and the common could be in the form of rigid pins which would mount directly into contact apertures in the front wall 22 of the cartridge housing 12. In this case, the electrical connection to the pins 84, 86 and 88 could be made within the housing 12 to provide an even more streamlined design and facilitate removal of the sensor and stylus subframe assembly 44.

Although the preferred embodiment has been shown and described with respect to a phonograph cartridge 10 as having a removable frame and stylus portion which additionally mounts the sensor 60, the entire unit could be made as a unitary item. However, the disclosure of the present invention makes possible the replacement of the sensor 60, when either of its active elements, the light source or the photodetector, would fail without having to replace the entire cartridge, and in the case of the alternate embodiment of FIG. 7, without even having to replace the stylus. Similarly, the stylus 42 can be changed without having to replace the entire cartridge or the sensor 60. However, the disclosure of the present invention makes possible the replacement of the sensor 60 when either one of the active elements, the light source or the photodetector, would fail without having to replace the entire cartridge. Similarly, the stylus 42 can be changed without replacing the entire cartridge. The cartridge 10 as described can be easily modified to accommodate various active sensor elements and various tone arm configurations without departing from the spirit and scope of the present invention. Therefore, the foregoing detailed description has been given for clearance of understanding only and no unnecessary limitations should be understood therefrom as some modifications will be obvious to those skilled in the art.

We claim:

1. A phonograph cartridge for mounting within a cartridge shell on the free end of a phonograph tone arm, comprising:
    a cartridge including an internal electro-mechanical transducer;
    a stylus connected to the electro-mechanical transducer for tracking a record groove; and
    an electro-optic sensor mounted on the cartridge in proximity to said stylus; said cartridge including a first and second set of connector pins for mounting the cartridge in a suitable cartridge shell on a phonograph tone arm, said first set of pins providing electrical connections between the electro-mechanical transducer and an amplifier, and said second set of pins for providing electrical connections between the electro-optic sensor and a land sensing electronic circuitry.

2. The phonograph cartridge of claim 1 wherein said stylus and sensor are mounted to a removable cartridge portion and include connection means between the sensor pins and the sensor.

3. The phonograph cartridge of claim 2 wherein said connection means includes a plurality of contact strips on the housing in alignment with a similar plurality of sensor leads on the removable cartridge portion for contact when the removable cartridge portion is mounted on the housing.

4. The phonograph cartridge of claim 1 wherein said electro-optic sensor includes a light source and a photodetector.

5. The phonograph cartridge of claim 4 wherein said light source is a light emitting diode.

6. The phonograph cartridge of claim 4 wherein said light source is an incandescent source.

7. The phonograph cartridge of claim 4 wherein said photodetector is a phototransistor.

8. The phonograph cartridge of claim 1 wherein said stylus and sensor are mounted to a removable cartridge portion to facilitate replacement of the stylus and/or sensor.

9. The phonograph cartridge of claim 8 wherein said removable cartridge portion includes alignment means between the cartridge and the removable cartridge portion to maintain proper alignment between the stylus and the cartridge.

10. The phonograph cartridge of claim 9 wherein said alignment means between the cartridge and the removable cartridge portion comprises a boss on one of said elements and a complementary shaped recess on the other of said elements permitting sliding engagement therebetween to properly align the cartridge and stylus.

11. The phonograph cartridge of claim 8 wherein the removable cartridge portion is mounted to the cartridge housing by a vibration transmitting shaft, said shaft being slidably engageable with a complementary shaped aperture in said cartridge.

12. The phonograph cartridge of claim 11 including alignment means about said shaft between the cartridge and the removable cartridge portion to maintain alignment between the stylus and the cartridge when the removable cartridge portion is mounted thereto.

13. A phonograph cartridge for mounting within a cartridge shell on the free end of a phonograph tone arm, comprising:
    a cartridge including an internal electro-mechanical transducer;
    a stylus;
    a removable frame portion removably mounted on said cartridge for mounting said stylus thereto for connection to said electro-mechanical transducer; and
    an electro-optic sensor mounted on said removable frame portion.

14. The phonograph cartridge of claim 13 including a plurality of connector pins for mounting the cartridge in a suitable cartridge shell on a phonograph tone arm, said pins providing electrical connections between the electro-mechanical transducer and an amplifier and for connecting the sensor to a land sensing electronic circuitry.

15. A phonograph cartridge for mounting within a cartridge shell on the free end of a tone arm, comprising:
    a cartridge for mounting an electro-mechanical transducer;
    a stylus connected to said electro-mechanical transducer for tracking a record groove;
    an electro-optic sensor; and
    means for adjustably mounting said electro-optic sensor on the cartridge for movement relative to said stylus.

16. The phonograph cartridge of claim 15 including locking means for securing said adjustable mounting means to prevent relative movement between the stylus and the sensor.

17. The phonograph cartridge of claim 13 wherein said frame portion includes means for movably mounting the sensor on the frame to permit adjustment thereof relative to the stylus.

18. The phonograph cartridge of claim 17 including locking means for securing said mounting means to prevent relative movement between the stylus and the sensor.

19. The phonograph cartridge of claim 15 wherein said sensor mounting means comprises dovetail means permitting relative sliding between said electro-optic sensor and said stylus.

20. The phonograph cartridge of claim 19 including locking means for securing said dovetail means to prevent relative movement between said stylus and said sensor.

21. The phonograph cartridge of claim 20 wherein said locking means comprises a set screw.

* * * * *